(12) United States Patent
Stojkovic et al.

(10) Patent No.: US 10,040,485 B1
(45) Date of Patent: Aug. 7, 2018

(54) ROOF STRUCTURE WITH INTEGRATED ROOF RACK AND ACCESSORY ATTACHMENT ASSEMBLIES

(71) Applicant: FORD GLOBAL TECHNOLOGIES, LLC, Dearborn, MI (US)

(72) Inventors: Dragan B. Stojkovic, Taylor, MI (US); Stephen Thomas Kozak, Northville, MI (US); Colleen Marie Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/426,194

(22) Filed: Feb. 7, 2017

(51) Int. Cl.
*B62D 25/07* (2006.01)
*B62D 25/04* (2006.01)
*B62D 27/02* (2006.01)
*B60R 11/00* (2006.01)

(52) U.S. Cl.
CPC ............. *B62D 25/07* (2013.01); *B60R 11/00* (2013.01); *B62D 25/04* (2013.01); *B62D 27/023* (2013.01); *B60R 2011/004* (2013.01); *B60R 2011/0049* (2013.01)

(58) Field of Classification Search
CPC ...... B62D 25/07; B62D 25/04; B62D 27/023; B60R 11/00; B60R 2011/004; B60R 2011/0049
USPC ...... 296/102, 104, 3, 163, 193.06, 208, 213, 296/210; 224/405, 309–331; 410/104, 410/106, 112; 248/228.2, 230.2
See application file for complete search history.

(56) References Cited

U.S. PATENT DOCUMENTS

| | | | | |
|---|---|---|---|---|
| 1,851,292 A | * | 3/1932 | Rasmussen | F16B 13/065 411/53 |
| 3,722,910 A | * | 3/1973 | Heckenlaible | B60P 7/0815 410/104 |
| 4,248,558 A | * | 2/1981 | Lechner | B60P 7/0815 410/104 |
| 4,355,844 A | | 10/1982 | Fantini Muzzarelli | |
| 5,494,327 A | * | 2/1996 | Derecktor | B60P 3/40 224/321 |
| 5,733,082 A | * | 3/1998 | Schrader | B60P 7/0807 410/101 |
| 5,915,900 A | * | 6/1999 | Boltz | B60P 7/0807 410/106 |
| 8,052,196 B1 | * | 11/2011 | Micheli | B60J 7/102 296/102 |
| 8,662,576 B2 | | 3/2014 | Lösch et al. | |

(Continued)

FOREIGN PATENT DOCUMENTS

EP 1454820 A1 9/2004

*Primary Examiner* — Dennis H Pedder
(74) *Attorney, Agent, or Firm* — Jason Rogers; Brooks Kushman P.C.

(57) ABSTRACT

A roof structure is disclosed for a vehicle that comprises a roof bow including a wall forming part of an exterior roof surface of the vehicle. The wall defines a keyhole opening that is adapted to receive a retainer. A channel is provided on the wall below the keyhole opening that forms a water drain below the keyhole opening with a lower surface of the wall extending over the water drain. A retainer including an anchor portion and an accessory attachment portion extends upwardly from the anchor portion through the slot and is retained in the channel by the flanges.

4 Claims, 4 Drawing Sheets

(56) References Cited

U.S. PATENT DOCUMENTS

2010/0215456 A1\* 8/2010 Murphy ................ B60P 7/0815
 410/104

\* cited by examiner

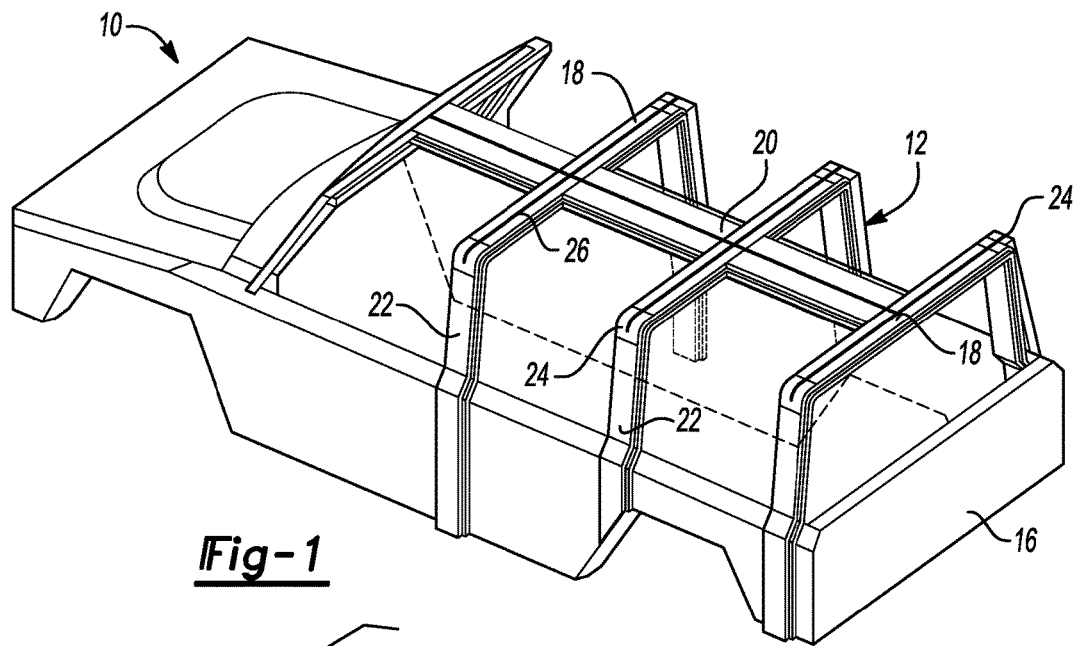
*Fig-1*
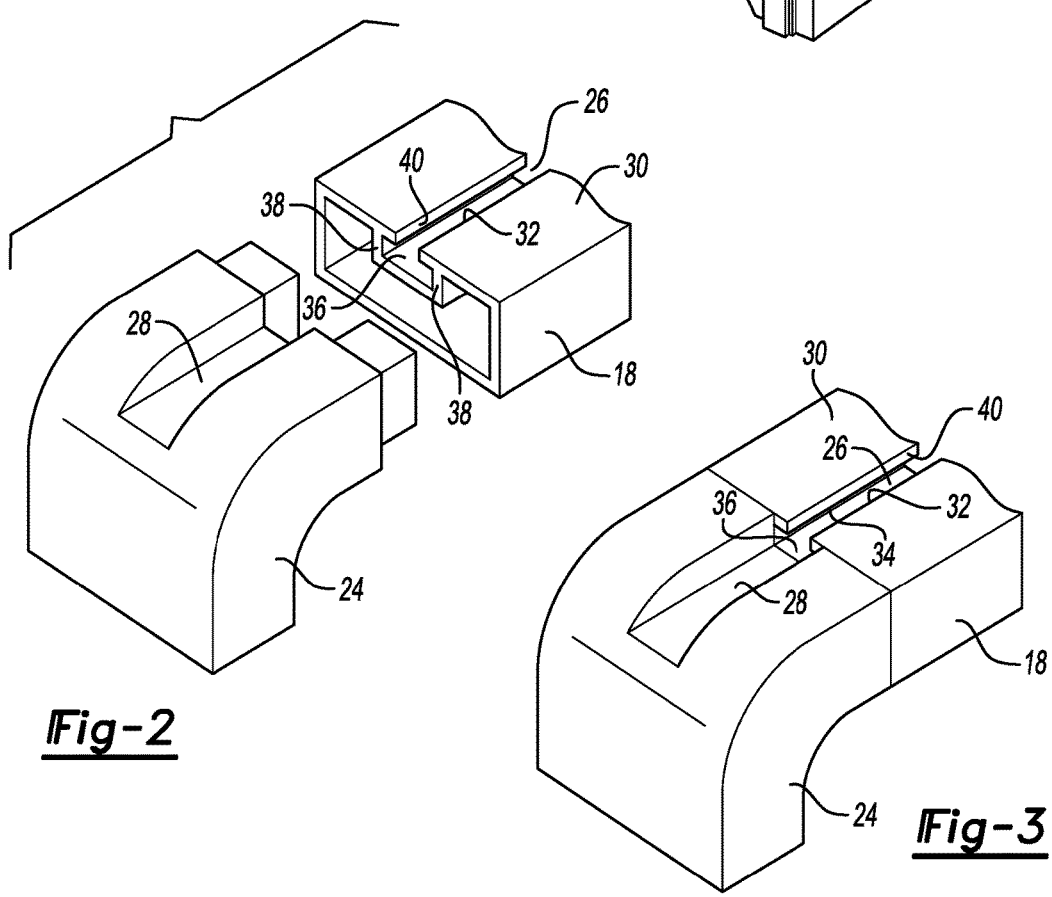
*Fig-2*
*Fig-3*

ROOF STRUCTURE WITH INTEGRATED ROOF RACK AND ACCESSORY ATTACHMENT ASSEMBLIES

TECHNICAL FIELD

This disclosure relates to a roof structure for a vehicle that includes an integrally formed track that is adapted to receive retain an accessory or a retainer utilized to secure objects to the roof.

BACKGROUND

Vehicles may be provided with a roof rack as original equipment or as an aftermarket accessory. Roof racks include side rails and cross bars that are used to support articles such as luggage, bicycles, coolers, tools, boxes and the like on top of the roof. Ropes, bungee cords, specialized racks for kayaks, ski racks and cargo containers are among the many types of items that may be attached to roof racks.

Police, fire and emergency vehicles are provided with accessories such as light bars, sirens and loudspeakers that may be attached to the roof of the vehicle. Attaching aftermarket accessories may entail drilling holes in the roof that can lead to corrosion or roof leaks.

It is difficult to attach roof racks or accessories to a vehicle roof either as original equipment or in the aftermarket because separate brackets must be provided requiring holes in the outer roof panel. Additional brackets are attached to the inner roof panel or roof bows. In addition, special adapters may be required to prevent distortion of the outer roof panel.

This disclosure is directed to solving the above problems and other problems as summarized below.

SUMMARY

According to one aspect of this disclosure, a roof structure is disclosed for a vehicle that comprises a roof bow including a wall forming part of an exterior roof surface of the vehicle. The wall defines a keyhole opening, or keyhole-like opening, that is adapted to receive a retainer. A channel is provided on the wall below the keyhole opening that forms a water drain below the keyhole opening with a lower surface of the wall extending over the water drain.

According to other aspects of this disclosure, the keyhole opening may be a slot or an X-shaped opening.

The channel may be a U-shaped channel having two side legs attached to the lower surface of the wall that are connected by a base wall.

The roof structure may further comprise a pillar supporting the roof bow and a connector assembled between the pillar and the roof bow that defines a slot that is aligned with the channel and adapted to receive any water flowing from the channel toward the slot in the connector.

The roof structure may further comprise a retainer including an anchor portion and an accessory attachment portion extending upwardly from the anchor portion through the keyhole opening. The anchor portion may be retained in the channel by the lower surface of the wall that extends over the water drain. The accessory attachment portion may be an eyelet formed on the accessory attachment portion. Alternatively, the accessory attachment portion may be a bracket part of an accessory.

The keyhole opening may be a slot and the anchor portion may be an articulated assembly having a locked position securing the anchor portion inside the channel and a released position in which the retainer may be repositioned within the slot. The articulated assembly may include two oppositely oriented wedges connected by a link portion of the retainer. The wedges may be held together by the link portion to form a rectangular block configuration in the locked position and are held together in a spaced relationship in the released position wherein the two wedges have a reduced height and can slide within the channel. The link portion may be part of the accessory attachment portion of the retainer that is pivotally connected to one of the wedges and is connected by a pin received in a slot to a second one of the wedges.

The wedges each may have a serrated ramp surface and may engage each other when the accessory attachment portion is moved in a first direction and may be disengaged by moving away from each other when the accessory attachment portion is moved in a second direction.

According to another aspect of this disclosure, a roof structure is disclosed for a vehicle that comprises a channel provided on a vehicle body that defines a slot opening to an exterior area outside the vehicle body. The channel may include flanges overhanging the channel that define the slot. A retainer including an anchor portion and an accessory attachment portion may extend upwardly from the anchor portion through the slot and may be retained in the channel by the flanges.

The roof structure may further comprise a roof bow that includes the flanges and forms part of an exterior roof surface of the vehicle. The flanges on the roof bow are adapted to receive a retainer. The channel may be provided below the slot and may form a water drain below the slot with a lower surface of the flanges extending over the water drain.

The above aspects of this disclosure and other aspects will be described below with reference to the attached drawings.

BRIEF DESCRIPTION OF THE DRAWINGS

FIG. 1 is a rear/left diagrammatic perspective view of a vehicle including a roof structure made according to one embodiment of this disclosure.

FIG. 2 is an exploded fragmentary perspective of a roof bow and a corner connector made according to one embodiment of the disclosed roof structure.

FIG. 3 is a fragmentary perspective view of a portion of a roof bow and corner connector made according to the embodiment of FIG. 2.

DETAILED DESCRIPTION

Figure 4:
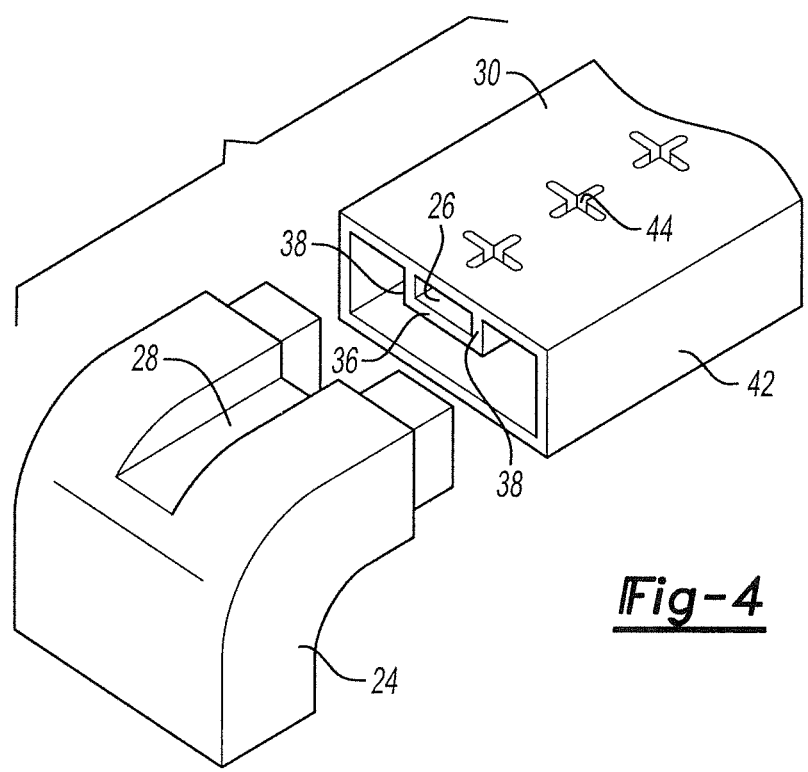
FIG. 4 is a fragmentary exploded perspective view of an alternative embodiment of a roof bow and a corner connector made according to another embodiment of this disclosure.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a vehicle is generally indicated by reference numeral 10 and is shown to include a roof structure generally indicated by reference numeral 12. The roof structure of the vehicle 10 is shown assembled to a lower body 16 that is diagrammatically shown in FIG. 1. The roof structure includes a plurality of roof bows 18 that extend transversely across the vehicle 10 from a central spine 20. The central spine 20 extends longitudinally at the center of the roof as illustrated in FIG. 1. The roof bows 18 extend to a plurality of pillars 22 generally referred to as the B, C and D pillars 22. The roof bows 18 are connected to the pillars 22 by corner connectors 24. A channel 26 is also shown that extends across the bows 18 and may also extend longitudinally in the central spine 20.

Referring to FIGS. 2 and 3, a roof bow 18 is shown with a corner connector 24. The channel 26 is shown in the roof bow 18 and is aligned with a groove 28 formed in an upper surface of the corner connector 24. The channel 26 is formed in an outer wall 30 of the roof bow 18. The outer wall 30 may also be referred to as a class A surface or outer surface of the roof bow and is open to the exterior of the vehicle. A keyhole opening 32, or slot, is formed in the wall 30. As used herein, the term keyhole refers to an opening or slot in which a retainer (described below) is inserted and is then secured as will be described below. The wall 30 includes a lower surface 34. A base wall 36 of the channel 26 is secured by two side legs 38 to the lower surface 34 of the wall 30. The base wall 36 and side legs 38 function as a water drain that direct any water flowing into the channel 26 toward the groove 28 in the corner connector 24.

Referring to FIG. 4, an alternative embodiment of a roof bow 42 is shown that includes a plurality of X-shaped keyhole openings 44 that are adapted to receive a hook or other type of retainer. Similar elements of the roof bow 42 to the roof bow 18 are referred to by the same reference numerals. The X-shaped keyhole openings 44 are formed in the wall 30 of the roof bow 42. Two side walls 38 extend from the wall 30 beneath the X-shaped keyhole openings. The side walls 38 and base wall 36 function as a water drain that allows water to flow through the channel and into the groove 28 formed in the corner connector 24.

Figure 5:
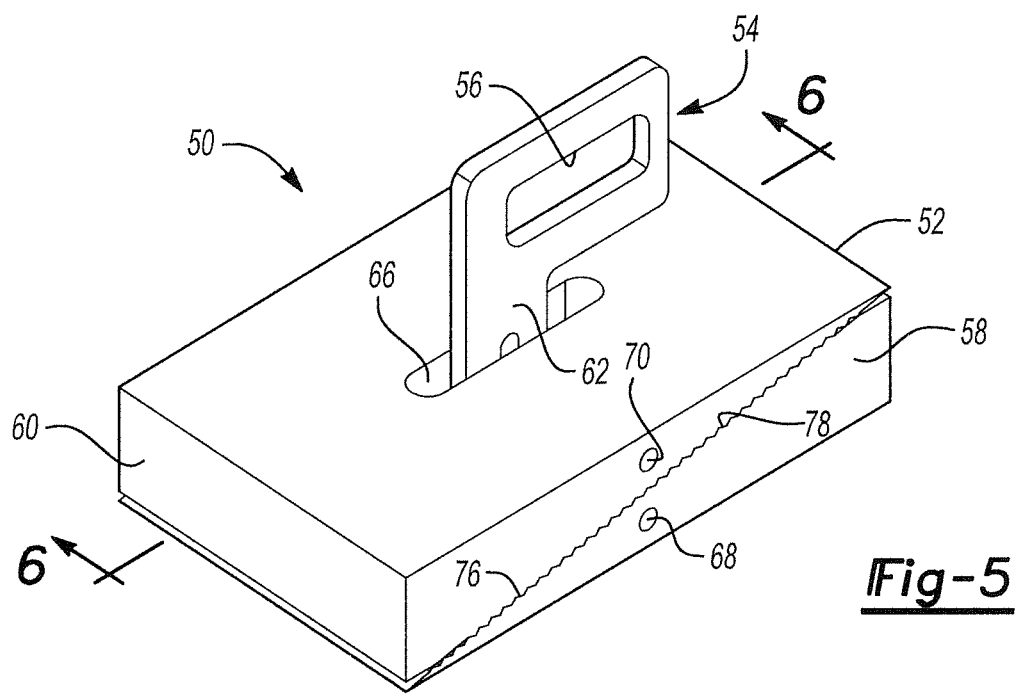
FIG. 5 is a perspective view showing the retainer in the locked position.
Figure 6:
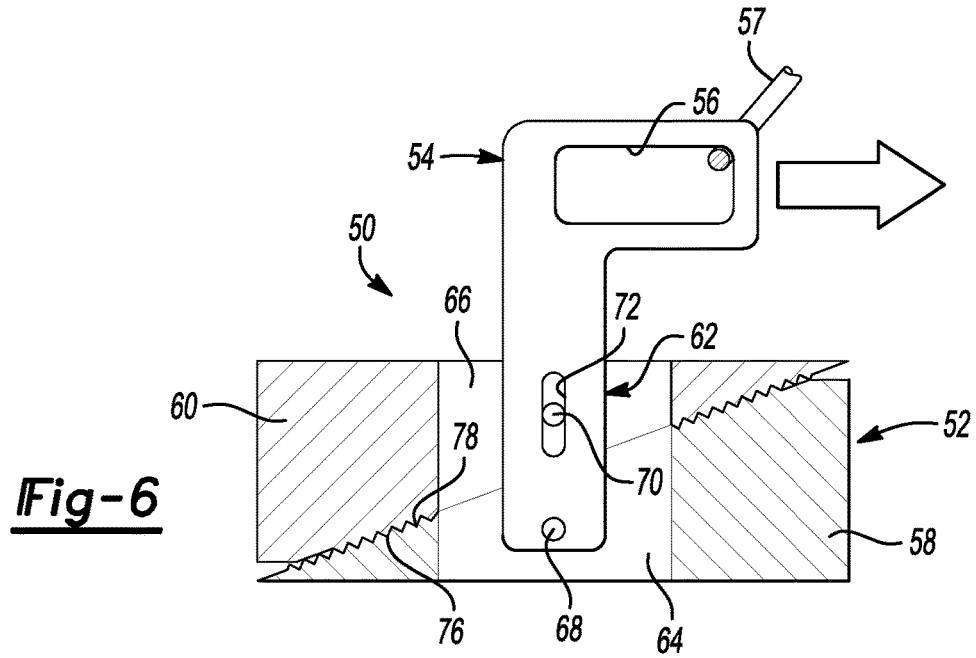
FIG. 6 is a cross-sectional view of a retainer taken along the line 6-6 in FIG. 5 showing the retainer in the locked position.
Figure 7:
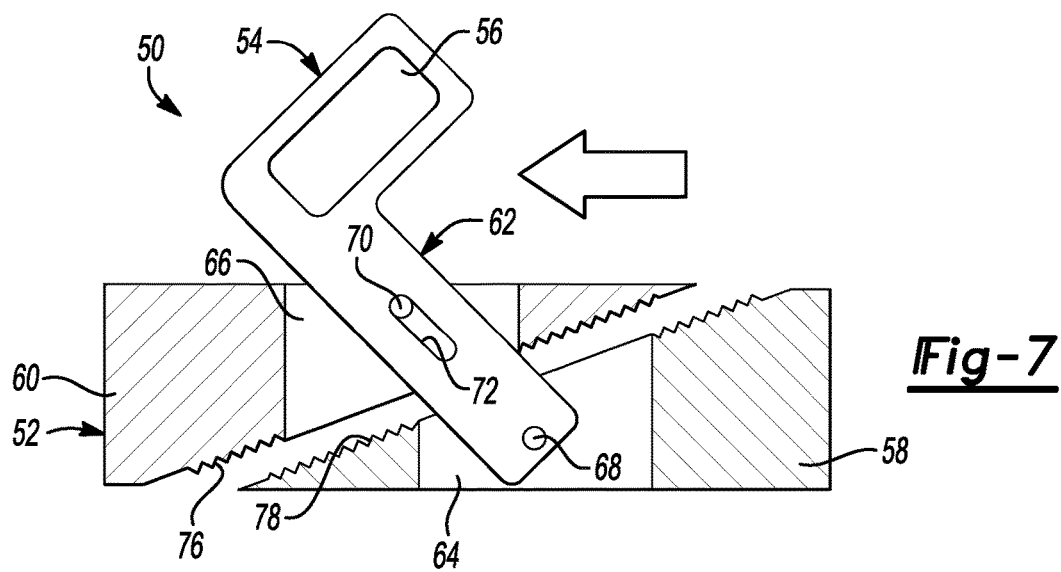
FIG. 7 a cross-sectional view similar to FIG. 6 showing the retainer in a released position.

Referring to FIGS. 5-7, a retainer 50 is shown to include an anchor portion 52 and an accessory attachment portion 54. The anchor portion is generally indicated by reference numeral 52. The accessory attachment portion 54 is shown to include an eyelet 56 that may be used to secure a rope 57. The rope 57 may also be a hook or bungee cord that is attached to a rope or strand to secure objects or cargo to the roof structure 12. The anchor portion 52 includes a first wedge 58 and second wedge 60. The first wedge 58 and second wedge 60 are oppositely oriented, as illustrated in FIGS. 5 and 6, to provide a rectangular block assembly that may be positioned together to provide a rectangular block having a different vertical dimension.

As shown in FIG. 5, the wedges are separated and shifted laterally to provide an anchor portion 52 having a reduced height allowing the anchor portion 52 to slide within the channel 26 as will be described with reference to FIGS. 9 and 10 below.

As shown in FIG. 6, the accessory attachment portion 54 of the retainer 50 is shifted to the right as shown by the large arrow in FIG. 6 as a result of pressure being applied by the rope 57 to the accessory attachment portion 54. The first wedge 58 and second wedge 60 are shifted into engagement to provide an anchor portion 52 having a greater height that is sufficient to lock anchor portion 52 within the channel 26 as will be described below with reference to FIGS. 9 and 10.

A link portion 62 of the retainer 50 is received in a first central slot 64 formed in the first wedge 58. A second central slot 66 is formed in the second wedge 60. The link portion 62 of the retainer 50 is received in the first central slot 64 and second central slot 66. The link portion 62 is retained in the slots by a pivot pin 68 that pivotably secures the link portion 62 to the first wedge 58. A guide pin 70 is secured to the second wedge 60 as is received in a guide slot 72 defined by the link portion 62 of the accessory attachment portion 54.

An upper serrated ramp surface 76 is provided on the second wedge 60 and a lower serrated ramp surface 78 is provided on the first wedge 58. The upper and lower serrated ramp surfaces 76 and 78 are provided as friction surfaces that facilitate locking the first wedge 58 to the second wedge 60 when pressure is applied to the accessory attachment portion 54 of the retainer 50. The serrated surfaces 76 and 78 could alternatively be roughened surfaces or surfaces otherwise having an increased coefficient of friction that resists lateral sliding movement of the wedges 58 and 60 relative to each other unless they are separated from each other as shown in FIG. 7.

Figure 8:
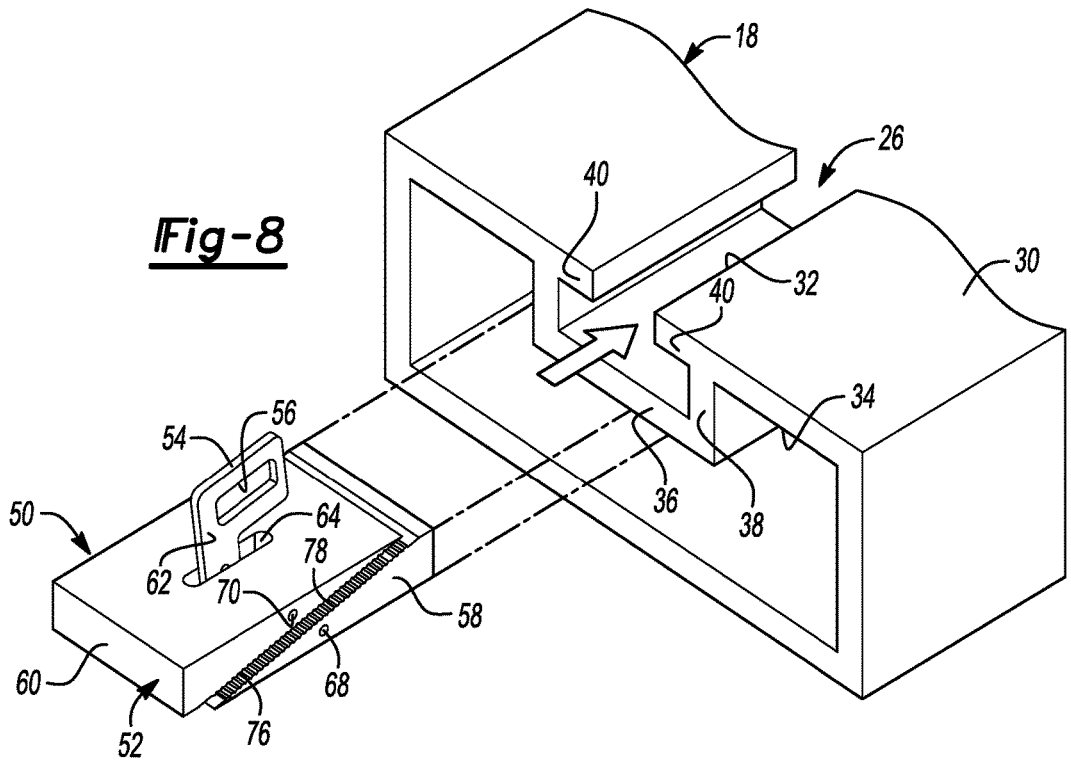
FIG. 8 is a fragmentary exploded perspective view showing the retainer in position to be inserted in the channel of a roof bow.

Referring to FIG. 8, the retainer 50 is shown separated from the roof bow 18 but in position to be inserted into the channel 26. The first wedge 58 and second wedge 60 are separated from each other to reduce the height of the anchor portion 52. With the anchor portion 52 in the released, or reduced height, position it may easily slide into the channel 26 with the accessory attachment 54 being received in the slot 32. As shown in FIG. 8, the serrated surfaces 76 and 78 are separated from each other and the accessory attachment portion 54 is shown pivoted to the left as shown in FIG. 8.

Figure 9:
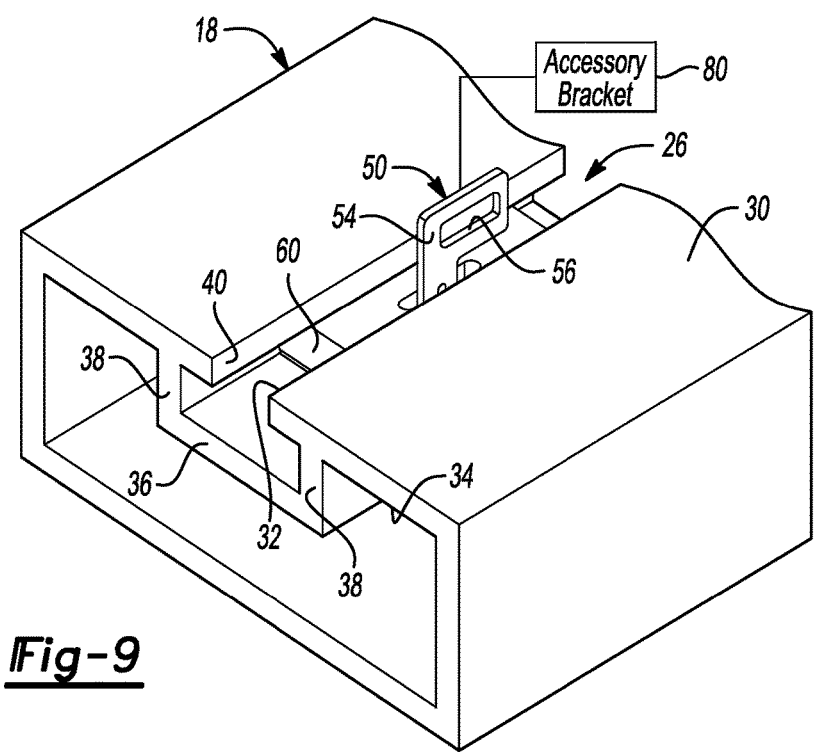
FIG. 9 is a fragmentary perspective view showing the retainer installed in the channel of a roof bow in the locked position.

Referring to FIG. 9, the retainer 50 is shown disposed within the channel 26 with the eyelet 56 being disposed above the wall 30 of the roof bow 18. The accessory attachment portion 54 is diagrammatically shown to be attached to an accessory bracket 80. The accessory bracket 80 could be a bracket of a light bar for an emergency vehicle, a siren or a loud speaker is adapted to be attached to the roof of the vehicle. The accessory attachment bracket may include a leg or other part that may be shifted in a manner similar to the accessory attachment portion 54 as previously described. The channel is shown to be enclosed by the base wall 36 and two side walls 38 that combine to form a water drain to allow any water entering the channel 26 to flow from the roof bow 18.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A roof structure for a vehicle comprising:
a roof bow defining a space below an outer surface of the roof;

a channel disposed in the space below the outer surface, the channel including flanges overhanging the channel that define a slot; and a retainer including an anchor portion and an accessory attachment portion extending upwardly from the anchor portion through the slot, wherein the anchor portion is retained in the channel by the flanges, wherein the anchor portion is an articulated assembly having a locked position securing the anchor portion inside the channel and a released position wherein the retainer may be repositioned within the slot, wherein the articulated assembly includes two oppositely oriented wedges connected by a link portion of the retainer, the wedges being held together by the link portion to form a rectangular block shape in the locked position and are held together in a spaced relationship in the released position wherein the two wedges have a reduced height and can slide within the channel, and wherein the link portion is part of the accessory attachment portion of the retainer that is pivotally connected to one of the wedges and is connected by a pin received in a slot to a second one of the wedges.

2. The roof structure of claim 1 wherein the wedges each have a serrated ramp surface, wherein the ramp surfaces engage each other when the accessory attachment portion is moved in a first direction and disengage by moving away from each other when the accessory attachment portion is moved in a second direction.

3. The roof structure of claim 1 wherein the roof bow includes the flanges and forming part of an exterior roof surface of the vehicle that is adapted to receive the retainer, wherein the channel forms a water drain below the slot with a lower surface of the flanges extending over the water drain.

4. A roof structure for a vehicle comprising:
a roof bow including a hollow body having a top wall forming part of an exterior roof surface of the vehicle, the top wall defining a linear slot for receiving a retainer; and a channel provided inside the hollow body below the linear slot in the top wall, the channel including two side legs connected by a base wall attached to the lower surface of the top wall, wherein the retainer includes an anchor portion and an accessory attachment portion extending upwardly from the anchor portion through the linear slot, wherein the anchor portion is retained in the channel by the lower surface of the top wall, wherein the anchor portion is an articulated assembly having a locked position securing the anchor portion inside the channel and a released position wherein the retainer may be repositioned within the linear slot, wherein the articulated assembly includes two oppositely oriented wedges connected by a link portion of the retainer, the wedges being held together by the link portion to form a rectangular block shape in the locked position and are held together in a spaced relationship in the released position wherein the two wedges have a reduced height and can slide within the channel, wherein the link portion is part of the accessory attachment portion of the retainer that is pivotally connected to one of the wedges and is connected by a pin received in a slot to a second one of the wedges.

\* \* \* \* \*